(12) United States Patent
Brockman

(10) Patent No.: US 8,047,560 B2
(45) Date of Patent: Nov. 1, 2011

(54) RETENTION COVER FOR AN INFLATABLE OBJECT

(75) Inventor: Clifford Russell Brockman, Strongsville, OH (US)

(73) Assignee: Avery Dennison Corporation, Pasadena, CA (US)

(*) Notice: Subject to any disclaimer, the term of this patent is extended or adjusted under 35 U.S.C. 154(b) by 602 days.

(21) Appl. No.: 11/824,810

(22) Filed: Jul. 3, 2007

(65) Prior Publication Data
US 2009/0008912 A1    Jan. 8, 2009

(51) Int. Cl.
B60R 21/213 (2006.01)
B60R 21/215 (2006.01)

(52) U.S. Cl. .............. 280/728.2; 280/728.3; 280/730.2

(58) Field of Classification Search .......... 280/728.2, 280/728.3, 730.2, 743.1; 24/16 R
See application file for complete search history.

(56) References Cited

U.S. PATENT DOCUMENTS

| | | | |
|---|---|---|---|
| 2,834,606 A | 5/1958 | Bertrand | |
| 3,510,150 A | 5/1970 | Wilfert | |
| 3,963,199 A * | 6/1976 | Pravaz | 244/148 |
| 4,281,211 A | 7/1981 | Tatum | |
| 4,761,318 A | 8/1988 | Ott | |
| 4,784,886 A | 11/1988 | Monget et al. | |
| 4,832,768 A | 5/1989 | Takahashi | |
| 4,891,256 A | 1/1990 | Kite, III et al. | |
| 4,939,818 A | 7/1990 | Hahn | |
| 4,939,819 A | 7/1990 | Moyer | |
| 5,075,933 A * | 12/1991 | Kemper | 24/16 R |
| 5,096,222 A | 3/1992 | Komerska et al. | |
| 5,142,743 A * | 9/1992 | Hahn | 24/16 R |
| 5,178,923 A | 1/1993 | Andrieu et al. | |
| 5,195,775 A * | 3/1993 | Komerska et al. | 280/732 |
| 5,221,108 A | 6/1993 | Hirabayashi | |
| 5,293,501 A | 3/1994 | Bennett et al. | |
| 5,300,337 A | 4/1994 | Andrieu et al. | |
| 5,324,074 A | 6/1994 | Christian et al. | |
| 5,357,049 A | 10/1994 | Plummer, III | |
| 5,518,795 A | 5/1996 | Kennedy | |
| 5,548,875 A * | 8/1996 | Hart et al. | 24/265 H |
| 5,745,958 A * | 5/1998 | Kaldor | 24/16 R |
| 5,765,867 A * | 6/1998 | French | 280/743.2 |
| 5,794,971 A * | 8/1998 | Boydston et al. | 280/733 |

(Continued)

FOREIGN PATENT DOCUMENTS
GB         2 309 942    *  8/1997

*Primary Examiner* — Eric Culbreth
*Assistant Examiner* — George D. Spisich
(74) *Attorney, Agent, or Firm* — Roberts Mlotkowski Safran & Cole, P.C.

(57) ABSTRACT

A retention cover manufacture in accordance with at least one embodiment of the present invention is disclosed. The cover manufacture can include a substrate textile such as a nonwoven substrate textile. Fastening elements can be attached to the first face of the substrate textile at or near the longitudinal edges. Moreover, a fastening element can be attached to the second face of the substrate textile substantially along the central longitudinal axis. Also, in accordance with at least one embodiment, a retention cover for enclosing, at least in part, an inflatable object is disclosed. The retention cover can include a textile where, at or near the first longitudinal edge, a loop element can be attached to the textile. In addition, at or near the second longitudinal edge, a hook element can be attached to the textile. Alternatively, at or near a longitudinal edge, an adhesive strip element can be attached to the textile.

14 Claims, 2 Drawing Sheets

U.S. PATENT DOCUMENTS

| | | |
|---|---|---|
| 5,861,579 A | 1/1999 | Bickersteth et al. |
| 5,891,547 A | 4/1999 | Lawless |
| 5,901,756 A | 5/1999 | Goodrich |
| 5,967,603 A * | 10/1999 | Genders et al. .......... 297/216.13 |
| 6,079,735 A | 6/2000 | Fallmann et al. |
| 6,145,879 A | 11/2000 | Lowe et al. |
| 6,205,623 B1 | 3/2001 | Shepard et al. |
| 6,328,080 B1 | 12/2001 | Winters |
| 6,481,063 B2 | 11/2002 | Shepard et al. |
| 6,481,744 B2 * | 11/2002 | Melia .......................... 280/730.2 |
| 6,581,885 B2 * | 6/2003 | Polad ........................... 248/74.3 |
| 6,626,456 B2 * | 9/2003 | Terbu et al. ................ 280/728.2 |
| 6,774,312 B2 | 8/2004 | Fatato |
| 6,808,199 B2 * | 10/2004 | Saderholm et al. ........ 280/730.2 |
| 6,963,031 B2 | 11/2005 | Gladfelter et al. |
| 7,083,188 B2 * | 8/2006 | Henderson et al. ........ 280/730.2 |
| 7,163,231 B2 * | 1/2007 | Kumagai ................... 280/730.2 |
| 7,303,206 B2 * | 12/2007 | Kippschull et al. ......... 280/728.2 |
| 7,357,408 B2 * | 4/2008 | Hall et al. ................... 280/728.2 |
| 7,396,044 B2 * | 7/2008 | Bauer et al. ................ 280/743.2 |
| 7,731,224 B2 * | 6/2010 | Enriquez et al. ........... 280/730.2 |
| 2002/0020995 A1* | 2/2002 | Abe et al. ................... 280/743.1 |
| 2002/0098311 A1 | 7/2002 | Lindner |
| 2002/0163169 A1* | 11/2002 | Fischer ....................... 280/730.2 |
| 2002/0195803 A1* | 12/2002 | Terbu et al. ................ 280/730.2 |
| 2003/0178832 A1* | 9/2003 | Dominissini et al. ...... 280/743.2 |
| 2004/0099426 A1* | 5/2004 | Bryl et al. ................... 174/35 C |
| 2005/0082798 A1* | 4/2005 | Tallerico et al. ............ 280/730.2 |
| 2005/0104335 A1* | 5/2005 | Henderson et al. ........ 280/728.2 |
| 2005/0186387 A1* | 8/2005 | Gallant et al. ................ 428/100 |
| 2006/0046007 A1* | 3/2006 | Hurwitz ....................... 428/36.1 |
| 2007/0046007 A1* | 3/2007 | Zarazua ...................... 280/743.1 |
| 2008/0061535 A1* | 3/2008 | Everard et al. ............ 280/728.2 |
| 2008/0284141 A1* | 11/2008 | Jang et al. .................. 280/728.2 |

* cited by examiner

RETENTION COVER FOR AN INFLATABLE OBJECT

FIELD

The invention generally relates to covers used with inflatable objects such as vehicular airbags and more particularly to covers or wraps for inflatable objects such as curtain bags that are a component of vehicular side-impact airbag assemblies.

BACKGROUND

Airbags are common, sometimes legally required, safety equipment when provided in motor vehicles and are designed to offer added protection to occupants in the event of an accident. A conventional vehicular airbag assembly typically includes a gas-inflatable bag, which is retained in its collapsed state (stowed) within a housing and inflates (rapidly) in response to a certain level of impact from a vehicle striking or being struck in one or more directions.

Large manufacturers of automobiles first provided airbags in the steering wheels of automobiles (driver-side airbags) as part of an airbag restraint system. Later, passenger-side airbags provided, for example, in the front dashboard or glove box became increasingly common. More recently, side-impact airbag assemblies ("SABs") designed to protect the head and/or chest of an occupant in the event of an impact (e.g., accident) involving the side of the vehicle have been provided in various automobile models and continue to gain popularity.

According to the National Highway Traffic Safety Administration ("NHTSA") of the United States Department of Transportation, there are three main types of SABs: chest (or torso) SABs, head SABs and head/chest combination SABs. Chest SABs are conventionally mounted in the side of a seat or in a door and are designed to offer protection to the chest of an adult occupant. Head SABs are conventionally mounted in the roof rail (within the headliner of a vehicle) above the side windows and are designed to offer protection to the head of an adult occupant. Moreover, there are two main types of head SABs: curtain SABs and tubular SABs. Typically, curtain SABs are designed to offer protection to both front and rear occupants during side impact and some designs provide a degree of protection from ejection if an automobile is involved in a roll-over event, while tubular SABs are typically designed to offer protection to front occupants. Lastly, head/chest combination SABs are conventionally mounted in the side of a seat and are often larger than chest SABs, and are designed to offer protection to both the head and chest of an adult occupant.

Unlike many frontal vehicular airbags (e.g., driver-side and passenger-side airbags), some SABs (e.g., curtain SABs) may not start to deflate for several seconds after inflation to offer added protection in the event of a roll-over. Importantly, many passenger vehicles can be equipped with both frontal and side-impact airbags, each airbag offering some additional protection. Likewise, additional airbag designs within or outside the above described categories are being considered and it would not be unexpected if new designs relying on like principles are incorporated into various passenger vehicles.

Airbag housings and/or covers often function to keep the stowed airbag in its folded state and to generally protect the airbag. Airbag covers (wraps) that are made from fabric or thin, pliable plastics are particularly useful in mounting side curtain airbags where more rigid housings can be difficult to effectively use due to the limited space offered by recesses often used for mounting the airbags around the openings defining passenger doors and/or windows.

Important properties of any housing or cover for a vehicular airbag include that the housings or covers should be forced open reliably and nearly instantaneously upon deployment of the airbag, which, for example, can happen within a fraction of a second (e.g., within milliseconds for some airbag assemblies including some SABS) after some predetermined level of impact. It is also usually desirable that the airbag housing opens at a predetermined portion(s) in order to assist in properly deploying the airbag in a desired orientation. Known airbag housings often have a frangible feature such as a line/region of mechanical weakness (e.g., a perforation) that fails when some amount of force is applied.

Unfortunately, tubular covers (wraps) having perforated regions of weakness require that certain considerations are undertaken such as whether the perforated area will stay intact during fabrication, shipping and installation while still having sufficient tearing properties for responding to airbag deployment. Particularly, such wraps relying on perforated regions require that the cover be applied in a tubular configuration to the airbag, which requires a certain level of delicacy and a certain amount of time in order to avoid premature tearing and to achieve proper placement. Such considerations have economic consequences.

SUMMARY

An embodiment of the present invention discloses a cover manufacture for producing a plurality of individual retention covers. The cover manufacture can include a substrate textile having a first face, a second face, a first longitudinal edge, a second longitudinal edge, a first lateral edge and a second lateral edge. A first fastening element can be attached to the first face of the substrate textile at or near the first longitudinal edge. Also, a second fastening element can be attached to the first face of the substrate textile at or near the second longitudinal edge. Moreover, a third fastening element can be attached to the second face of the substrate textile substantially along the central longitudinal axis.

Another embodiment of the present invention discloses a method of manufacturing a plurality of retention covers that can include unwinding a first roll of substrate textile, feeding the substrate textile into a production line, attaching one or more fastening elements to the substrate textile, perforating one or more portions of the substrate textile and rewinding the substrate textile into a second roll.

Yet another embodiment of the present invention discloses a retention cover for enclosing, at least in part, an inflatable object that can include a textile. The textile can have a first face, a second face, a first longitudinal edge and a second longitudinal edge. At or near the first longitudinal edge, a loop element can be attached to the textile. At or near the second longitudinal edge, a hook element can be attached to the textile.

Still another embodiment of the present invention discloses a retention cover for enclosing, at least in part, an inflatable object that can include a textile. The textile can have a first face, a second face, a first longitudinal edge and a second longitudinal edge. At or near the first longitudinal edge, an adhesive strip element can be on the textile.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Embodiments of the present invention may be suitable for retaining and/or enclosing (at least in part) any inflatable or expandable object as well as assist in controlling or wholly control the orientation of deployment upon inflation. Particularly, embodiments of the present invention may be suitable for retaining, inter alia, any of the types of vehicular airbags known to one having ordinary skill in the art. Notwithstanding the foregoing, exemplary embodiments will generally be described herein in reference to one or more inflatable side curtain airbag assemblies ("IC assembly" or "IC assemblies") without any intent to limit embodiments of the present invention thereto.

Figure 1:
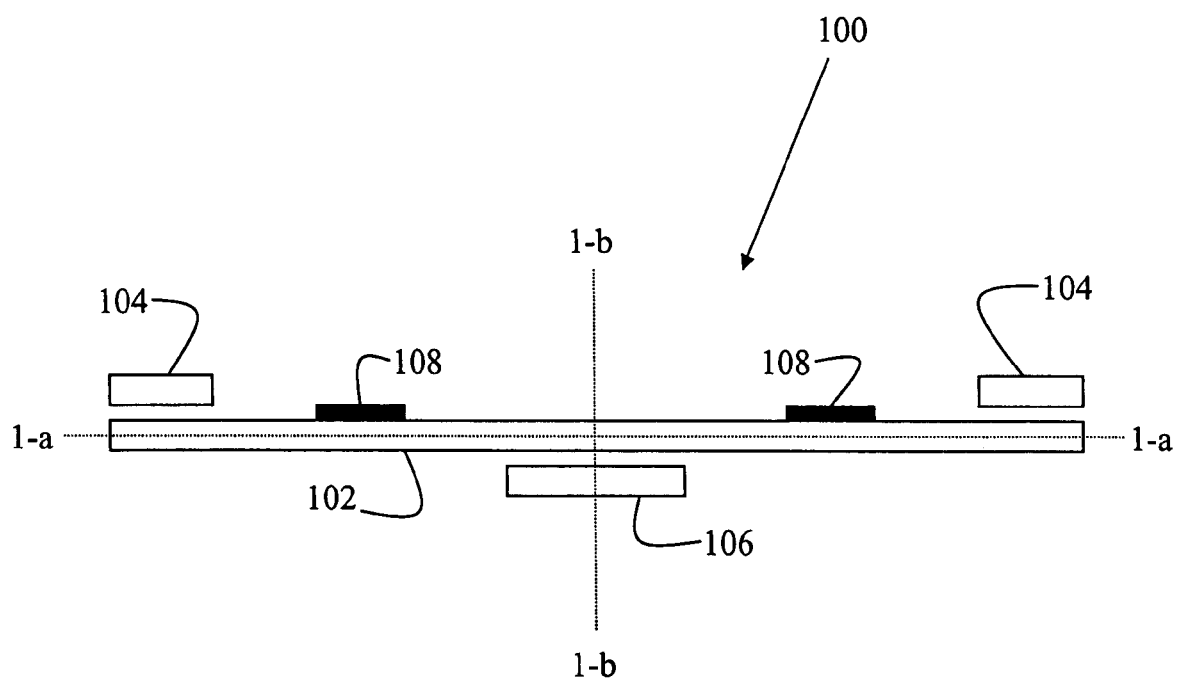
FIG. 1 diagrammatically depicts a cross-sectional view of a web of an exemplary multi-component cover manufacture.

FIG. 1 shows a cross-sectional view of a web of exemplary multi-component cover manufacture 100 that may allow for the fashioning of individual retention covers (wrap-like covers) therefrom. Cover manufacture 100 may be fabricated as one or more industrial rolls (see FIG. 2) having "removal" perforations between individual retention covers. In other words, individual retention covers can be unfurled and then removed, for example, at perforations (i.e. along horizontal axis 1-a) placed between retention covers formed on cover manufacture 100, where cover manufacture 100 can have a continuous nature such as may be particularly suitable for providing in roll form. Alternatively, singularly or in conjunction, individual retention covers can be cut directly from cover manufacture 100 without the need for "removal" perforations and can be provided in various units, for example, various shipping units.

Once removed (e.g., by tearing or pulling off), individual retention covers can be used to enclose, at least in part, an inflatable curtain bag of an IC assembly when, for example, the inflatable curtain bag is in a collapsed and folded state (i.e. stowed or in preparation for stowing in a vehicle). An individual retention cover can be applied to a collapsed and folded curtain bag in a substantially flat state and can be worked (e.g., rolled) around the longitudinal circumference of the inflatable curtain bag. Thus, individual retaining covers may be of a tubular configuration when encircling an inflatable curtain bag substantially along the longitudinal length thereof and can be made to remain in the tubular retaining state by engaging a fastening mechanism.

Cover manufacture 100 can have as a fabrication base a manufacturing substrate such as substrate textile 102. Substrate textile 102 can be any suitable textile (woven or non-woven) and the like known to one having ordinary skill in the art. For example, non-woven textiles according to at least one exemplary embodiment can include thermoplastic polymers such as polypropylene ("PP" or "PPL") or polyethylene terephthalate ("PET"), the later being one exemplary polymer from the polyester family, and other like polymers known to one having ordinary skill in the art. Additionally, non-woven textiles can be spunlaid non-woven textiles such as PPL spunbonds and PET spunbonds. Overall, substrate textile 102 can be flexible enough to allow itself to be wrapped (e.g., by rolling) around an inflatable object such as an inflatable curtain bag when in a deflated and folded state.

Still referring to FIG. 1, one or more fastening elements 104 can be attached proximate one or both longitudinal edges of substrate textile 102 where each fastening element 104 can be on the first face (shown as the top face) of substrate textile 102. In other words, each fastening element 104 can be attached to (or near) the portion defining a first longitudinal edge of an individual retention cover upon removal from cover manufacture 100. Individual retention covers can be removed from cover manufacture 100 when, for example, cover manufacture 100 has "removal" perforations spaced evenly along its width (horizontal axis 1-a) and a split defined substantially along its central longitudinal axis (e.g., at vertical axis 1-b). The split forming what can be considered two cover manufactures halves that are initially (i.e. during splitting) mirror images of each other. Moreover, attachment of fastening element 104 to substrate textile 102 can be accomplished, for example, by ultrasonic welding (and trimming) techniques known to one having ordinary skill in the art.

Fastening element 104 can be a loop element such as a loop fastening strip (of a hook-and-loop fastening system) attached to portions of textile substrate 102 that may define or nearly define the first longitudinal edges of individual retention covers. Hook-and-loop fastening systems are well-known in the art and are sold under brand names such as VELCRO®. Importantly, hook-and-loop fastening systems come in numerous variations and embodiments of the present invention are not limited to those systems only having traditional hook and loop elements, but rather extend to all suitable hook-and-loop fastening systems such as mushroom head-style hook elements that are included within the genus. Alternatively, other fastening systems such as adhesive fastening systems known to one having ordinary skill in the art can be used with embodiments.

As stated above, various loop elements can be used in accordance with embodiments of the invention. For example, at least one exemplary embodiment can use a high loft PPL non-woven loop element or a high loft PET non-woven loop element and any composite of the two. Moreover, as one non-limiting example, a strip of such a high loft non-woven loop element having about a 18 mm width may be suitable for making certain retention covers for use with specified inflatable curtain bags.

As shown in FIG. 1, particularly for embodiments utilizing hook-and-loop fastening systems, fastening element 106 can be attached to substrate textile 102, for example, attachment can be substantially inboard of substrate 102. In at least one exemplary embodiment, attachment can be by ultrasonic welding. Moreover, attachment can be on a portion of the second face (shown as the bottom face) of substrate textile 102 substantially along the central longitudinal axis thereof where the portion can define or can nearly define a second longitudinal edge for an individual retention cover when removed from, for example, a centrally split cover manufacture 100. In at least one exemplary embodiment, fastening element 106 can be a hook or hook-style element and may be provided in strip form (i.e. a hook fastening strip). As one non-limiting example, a high performance hook fastening strip can be attached to substrate textile 102. Further, an exemplary high performance hook fastening strip may have a width of about 20 mm when attached to substrate textile 102 of cover manufacture 100.

In at least one exemplary embodiment, a hook-and-loop fastening system can include an extruded low-profile mushroom head-style touch fastener. Such an exemplary system may also be capable of forming a bond between fastening element 104 and fastening element 106, when, for example, mated on an individual retention cover tubularly associated with a side curtain bag, that is of such strength that it cannot be operatively disengaged (broken) under ordinary stress.

In fact, in at least one exemplary embodiment where individual retention covers include a frangible feature such as a region of mechanical weakness defined thereon, the greater than ordinary force provided by the side curtain bag during deployment may not break the bond between fastening element 104 and fastening element 106 by design as the frangible feature can fail before so. Exemplary regions of mechanical weakness can be "break" perforations, for example, in line form that are define on longitudinal portions of cover manufacture 100 by, for instance, die cutting processes known in the art. One or more "break" perforations can occupy a longitudinal portion of each individual retention cover defined within cover manufacture 100.

Alternatively, perforations can be in various patterns and can be formed by numerous methods including by laser as will be appreciated by one skill in the art. Moreover, other frangible features for use with embodiments of the present invention can include catch threads, frangible seams, grooves, thin-walled sections, lower-tensile-strength material embedments and the like known to one having ordinary skill in the art.

Also, in at least one other exemplary embodiment where individual retention covers do not include a frangible feature as described above, the bond between fastening element 104 and fastening element 106 can act as a frangible feature. As such, it can take substantial force such as can be provided by the deployment process of a side curtain bag to disengage the bond between fastening element 104 and fastening element 106 while still being resistant to breaking under ordinary stress.

As referred to above, in at least one exemplary process for fabricating cover manufacture 100, cover manufacture may be split (or, alternatively, perforated for later splitting) substantially about the central longitudinal axis (e.g., at vertical axis 1-*b*). Splitting may occur after fastening element 106, if any, is attached to substrate textile 102. For example, if a high performance hook fastening strip having a width of about 20 mm is attached to substrate textile 102 substantially inboard, then splitting substrate textile 102 substantially about the central longitudinal axis (e.g., at vertical axis 1-*b*) of substrate 102 results in two (initially mirrorly opposing) second longitudinal edges for retention covers having hook fastening strips with widths of about 10 mm attached to or near such edges.

Thus, in embodiments having hook-and-loop fastening systems, fastening element 104 can be on the first face proximate the first longitudinal edge of each individual retention cover and fastening element 106 can be on the second face proximate the second longitudinal edge (and can be on the second face) where mating element 104 with element 106 can hold an individual retention cover in a tubular form around an inflatable curtain bag until sufficient force is provided to cause any frangible feature to fail or, alternatively, to break the bond between element 104 and element 106. For example, sufficient force may be the amount of force provided by a rapidly inflating side curtain bag of an IC assembly responding to a suitable vehicular collision.

Alternatively, one or both of fastening element 104 or fastening element 106 can be an adhesive element, which may be provided in strip form on substrate textile 102 and also can run along the portion of substrate textile 102 that may define longitudinal edges of an individual retention cover. Thus, such embodiments may only require one adhesive strip element that can be either fastening element 104 or fastening element 106 and it will be appreciated by one skilled in the art how to produce cover manufacturers only requiring such. Also, one or more adhesive elements can be attached to substrate textile 102 by ultrasonic welding or any other method known to one having ordinary skill in the art.

Moreover, in at least one exemplary embodiment, an adhesive element such as a pressure sensitive adhesive strip can be laminated with a release liner so that the release liner can be removed to expose an adhesion portion for bonding the pressure sensitive adhesive element, for instance, proximate a portion of the retention cover defining the other longitudinal edge located on the opposite face of an individual retention cover. Thus, the portion proximate the other longitudinal edge and on the opposite face of the individual retention cover can define an attachment portion, which can be considered fastening element 104 or 106, respectively, because, for example, the portion can be considered an adherend on the individual retention cover for bonding an exposed adhesive strip.

Further, in at least one exemplary embodiment, the pressure sensitive adhesive strip element can be a transfer tape such as an unsupported high performance acrylic adhesive transfer tape. As such, the transfer tape can have a first liner with an acrylic adhesive coated on the first liner and can have a removable second liner provided over the adhesive. Upon removal of the second liner, the exposed pressure sensitive strip can be bonded to an adherend.

Still referring to FIG. 1, markers can be fabricated on substrate textile 102, for example, marker portions (e.g., bands) 108 can be printed on substrate textile 102. For instance, substrate textile 102 that is spunlaid (e.g., PPL spunbond or PET spunbond) may be an attractive choice because such a substrate textile 102 can have the ability to allow marker bands 108 (as well as other prints) to be printed and may be cost-effective. In general, exemplary marker bands 108 can be printed in a color(s) that differs from that of the substrate so as to increase visibility of the band. Each marker band 108 can be printed so as to be substantially inboard (e.g., substantially along the longitudinal central longitudinal axis) of an individual retention cover when removed from cover manufacture 100.

Also, marker portions 108 can have a frangible feature such as a die cut "break" perforations defined within their respective bounds on substrate textile 102. Alternatively, frangible features can be defined on any portion of cover manufacture 100 and the individual retention covers upon removal therefrom. For example, frangible features can be defined proximate to the attachment portions for either or both of fastening element 104 and fastening element 106 on an individual retention cover.

As is known in the art, marker bands 108 are often used to assist in ensuring proper orientation of the individual retention cover and associated inflatable curtain bag when installed in a vehicle. In vehicles housing IC assemblies, particularly, housing the inflatable curtain bag in a recess defined generally above a side door of the vehicle, marker bands 108 can indicate an orientation where the inflatable curtain bag will inflate generally parallel to the lateral surfaces of the vehicle so as to provide side-impact protection.

Figure 2:
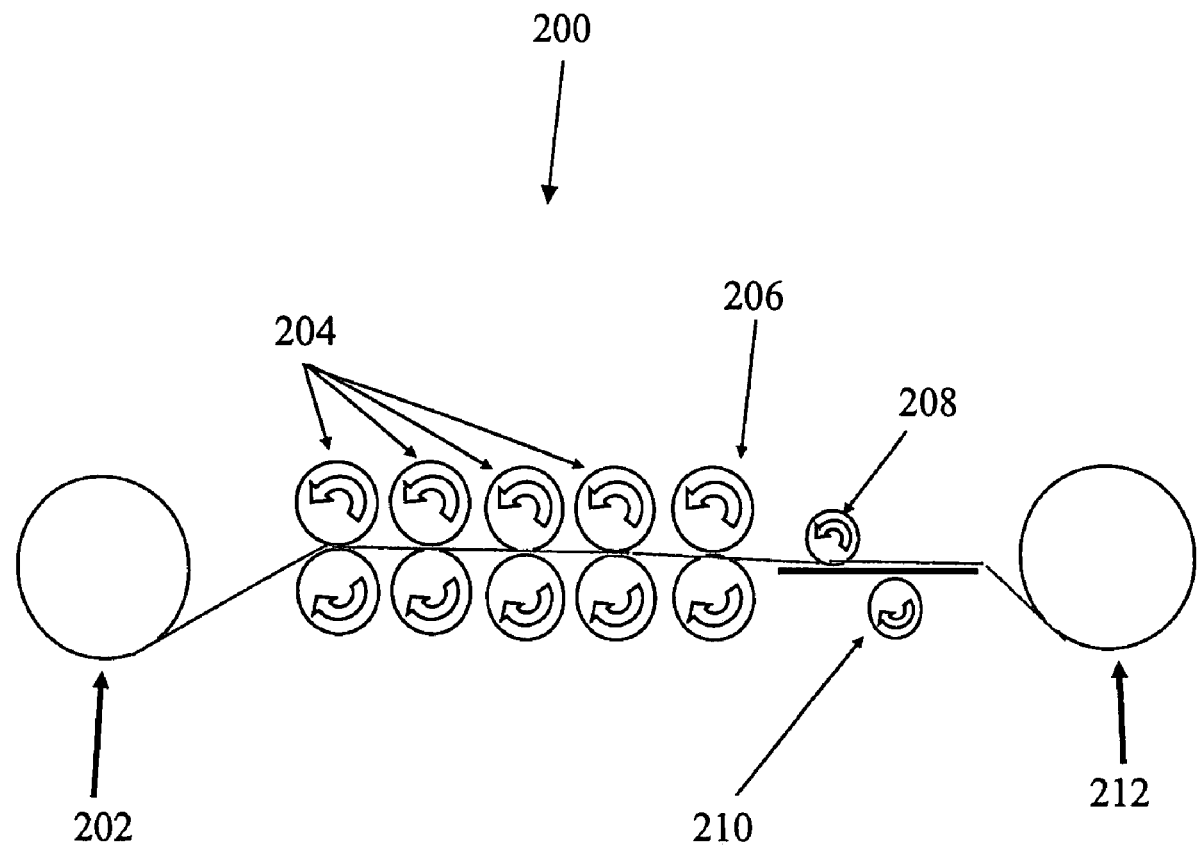
FIG. 2 diagrammatically depicts an exemplary production line for producing a multi-component cover manufacture.

Now referring to FIG. 2, which shows an exemplary path of manufacture that can result in an exemplary cover manufacture like cover manufacture 100 of FIG. 1. Exemplary production line 200 can include, inter alia, first roller station 202, print stations 204, perforator station 206, first attachment (e.g., ultrasonic welder) station(s) 208, second attachment (e.g., ultrasonic welder) station(s) 210 and second roller station 212. Production line 200 can provide roll-to-roll functionality between first roller station 202 and second roller station 212, and may decrease labor costs as compared to known manufacturing processes for retention covers that are not roll-to-roll processes.

It will be appreciated by those having ordinary skill in the art that the exemplary stations of FIG. 2 can be arranged in various orders and configurations. Also, it will be appreciated that such exemplary stations can be removed and/or new stations added consistent with embodiments of the present invention. Moreover, it will be appreciated that functionalities associated with each station can be removed from that station itself and/or new functionalities can be added to other stations. Further, it will be appreciated that the functionalities of stations as well as stations themselves can be combined or separated. Still further, stations of similar or supporting functionality can be added or removed to increase or decrease, respectively, the cumulative capabilities of any remaining similar or primary stations.

At first roller station 202, an industrial roll of textile (i.e. plastics, fabrics, etc.) such as an industrial roll of substrate textile 102 can be loaded and can be put in a state of unwinding until unwound. As substrate textile 102 may travel from first roller station 202, substrate textile 102 can be acted upon by one or more print stations 204. As shown in FIG. 2, four print stations 204 can be included on production line 200. Print stations 204 can print markers such as marker bands 108. For example, each print station or unit 204 can print a single color such a blue, red, orange, black, cyan, magenta, yellow and the like.

Print stations 204 can form a part of a flexographic printing press, which can be modified as needed for the production of retention covers or rolls thereof. A suitable flexographic printing press can print such things as marker bands 108 by the cooperative printing of printing stations 204 where each print station can print a single color. In addition, a suitable flexographic printing press can also allow for the printing (e.g., direct printing) of various features including warnings labels, "anti-twist" strips and the like known to one having ordinary skill in the art.

Along production line 200, substrate textile 102 can be acted upon by perforator station 206, which can provide "break" perforations along, at least partly, the length of substrate textile 102 so as to provide mechanical regions of weakness. "Break" perforations can be die cut perforations and perforator station 206 can have die cutting functionality. Such "break" perforations may be defined within the bounds of marker portions 108 or on any other portion of substrate textile 102.

At perforator station 206 or at another station having perforating functionality, for example, a station (now shown) after attachment stations 208 and 210, "removal" perforations may be defined substantially evenly spaced along the width of substrate textile 102 (along horizontal axis 1-$a$ of FIG. 1) defining the lateral edges of individual retention covers. The "removal" perforations may be die cut by a station having die cutting functionality.

Also, still referring to FIG. 2, along production line 200, substrate textile 102 can be acted upon by one or more first (e.g., shown as a top station) attachment stations 208 such as one or more ultrasonic welder stations 208. Particularly, in hook-and-loop fastening embodiments, two ultrasonic welder stations 208 can act on the first face of substrate textile 102 by ultrasonically welding fastening elements (e.g., loop elements) 104 outboard thereof proximate both longitudinal edges. Likewise, another attachment station 210 (shown as a bottom station) such as second ultrasonic welder station 210 can act upon a second face of substrate textile 102 by ultrasonically welding fastening element (e.g., hook element) 106 inboard substantially along the central longitudinal axis of substrate textile 102.

On the other hand, exemplary embodiments having, for example, adhesive strip elements (i.e. fastening elements 106) may have such elements ultrasonically welded by two ultrasonic welder stations 208 proximate the longitudinal edges of substrate textile 102, or, alternatively or in conjunction, an adhesive strip element (i.e. fastening element 108) can be ultrasonically welded by ultrasonic welder station 210 substantially along the central longitudinal axis of substrate textile 102.

Ultrasonic welding may be performed in a continuous manner by passing two substrates (i.e. substrate textile 102 and fastening elements 104, or substrate textile 102 and fastening element 106) between a rotating anvil roll and a sonotrode that imparts ultrasonic energy to the substrates. The anvil roll can have raised details for providing a weld pattern to the substrates. The weld pattern can be selected so as to ensure sufficient attachment between the substrates being welded, while, for example, being also selected to minimize deformation on fastening elements 104 and/or 106 in order to promote sufficient bonding between fastening element 104 and fastening element 106 when mated.

Still referring to FIG. 2, second attachment station 210 such as second ultrasonic welder station 210 can also include splitting functionality and may split substrate 102 substantially about its central longitudinal axis (e.g., at vertical axis 1-$b$). Mechanisms by which splitting can be carried out are well known in the art. It is reiterated here that splitting functionality is not a necessary function of second ultrasonic welding station 210 as splitting, for example, can be performed at another station on production line 200, for instance, after ultrasonic welding has been performed. Likewise, perforating (whether on the along the length or width of substrate textile 102) can be performed after ultrasonic welding has been performed.

Continuous substrate textile 102 can be subjected to second roller station 212 at the end of production line 200 where it can be in the process of rewinding until rewound at second roller station 212. Once rewound, production line 100 can achieve roll-to-roll functionality. Also, once rewound at second roller station 212, a roll of cover manufacture 100 may be formed and unloaded from second roller station 212 and, for instance, can be subjected to further fabrication processes and/or shipping preparations as well as installation procedures for providing IC assemblies having retention covers to passenger vehicles.

A roll of cover manufacture 100 can allow individual retention covers to be separated off (e.g., snapped or torn off) at "removal" perforations for installation purposes. Once removed, an individual retention cover according to at least one exemplary embodiment can be applied to a collapsed and folded curtain bag of an IC assembly. Rolling/wrapping an individual retention cover around an inflatable curtain bag can put the individual retention cover into a tubular state.

Mating fastening element 104 to fastening element 106 (or vice versa) can provide fastening that retains the retention cover around the inflatable cover bag.

A retention cover in a fastened tubular state can assist in retaining an inflatable curtain bag in a collapsed and folded state (as well as potentially offering some degree of protection against damage to the curtain airbag from outside objects) until the IC assembly is activated for deployment and the curtain bag is rapidly inflated, thus, providing sufficient force to readily break the frangible feature or, alternatively, the fastening hold between element 104 and element 106. If the IC assembly is properly installed, the "break" point(s) can direct the inflatable curtain bag to deploy as intended for offering protection a fraction of a second after a vehicle strikes or is struck by one or more objects with sufficient force to activate the IC assembly.

In one exemplary embodiment, in order to install a retention cover tubularly associated with an inflatable current bag, marker band 108 can be suitable aligned in an appropriate recess/housing defined within, for example, a passenger vehicle. Additionally, installation may have an individual retention cover either before, during or after association with an inflatable curtain bag undergo further modifications or have additional elements added thereto that may be necessary for installation.

For example, a retention cover may need openings, holes, slots, slits, cut-outs, channels and the like defined therethrough as may be necessary for proper installation. Additionally, a retention cover may need integral or modular tabs, appendages, folds, flaps and the like defined thereon as may be necessary for proper installation. Further, a retention cover may need to be associated with structures that are part of the IC assembly or a recess defined, for instance, in a passenger vehicle for housing portions of the IC assembly.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A retention cover for an inflatable object, comprising:
    a cover means for tubularly enclosing said inflatable object substantially along all of a length of said object, said cover means including a panel of textile having a first longitudinal edge and a second longitudinal edge in opposition to said first longitudinal edge, said first and second edges being straight and substantially parallel to one another;
    means for detachably fastening said cover means around said inflatable object, including a loop element attached to the textile proximate the first longitudinal edge; and a hook element attached to the textile proximate the second longitudinal edge, and
    a frangible feature defined on the textile proximate to but separate from one or the other of the loop element and the hook element
    wherein both of said means for detachably fastening said cover means and said frangible feature can release said inflatable object from said cover means upon inflation of said object and
    wherein said inflatable object is separate and apart from said cover means.

2. The cover of claim 1, wherein said loop element is attached to the first face of the single panel of textile and the hook element is attached to the second face of the single panel of textile and said first face overlaps said second face when said hook and loop elements are engaged.

3. The cover of claim 1, wherein said cover means is formed from a single panel of textile material.

4. The cover of claim 1, wherein said panel is continuous.

5. The cover of claim 1 wherein the textile is a non-woven textile.

6. The cover of claim 5 wherein the textile is a thermoplastic polymer.

7. The cover of claim 6 wherein the textile is polypropylene or polyethylene terephthalate.

8. The cover of claim 5 wherein the non-woven textile is a spunlaid non-woven textile.

9. The cover of claim 1 wherein the loop element is on the first face of the textile.

10. The cover of claim 1 wherein the loop element is a loop fastening strip.

11. The cover of claim 10 wherein the loop fastening strip is attached via ultrasonic welding.

12. The cover of claim 1 wherein the loop element is a high loft non-woven loop element.

13. The cover of claim 1 wherein the hook element is a hook fastening strip.

14. The cover of claim 13 wherein the hook fastening strip is attached via ultrasonic welding.

* * * * *